(12) United States Patent
Kravitz et al.

(10) Patent No.: US 9,455,978 B2
(45) Date of Patent: *Sep. 27, 2016

(54) SYSTEM AND METHOD TO ENABLE PKI- AND PMI- BASED DISTRIBUTED LOCKING OF CONTENT AND DISTRIBUTED UNLOCKING OF PROTECTED CONTENT AND/OR SCORING OF USERS AND/OR SCORING OF END-ENTITY ACCESS MEANS—ADDED

(71) Applicant: T-Central, Inc., Palo Alto, CA (US)

(72) Inventors: David W. Kravitz, Fairfax, VA (US); Donald Houston Graham, III, Pasadena, CA (US); Josselyn L. Boudett, Clearwater, FL (US); Russell S. Dietz, Los Gatos, CA (US)

(73) Assignee: T-Central, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,225

(22) Filed: Jan. 20, 2016

(65) Prior Publication Data

US 2016/0248760 A1  Aug. 25, 2016

Related U.S. Application Data

(63) Continuation of application No. 14/218,897, filed on Mar. 18, 2014, now Pat. No. 9,270,663, and a continuation-in-part of application No. 13/481,553, filed on May 25, 2012, now abandoned, and a (Continued)

(51) Int. Cl.
  *H04L 9/32* (2006.01)
  *H04L 29/06* (2006.01)
  *H04L 9/08* (2006.01)

(52) U.S. Cl.
  CPC ............ *H04L 63/08* (2013.01); *H04L 9/0894* (2013.01); *H04L 9/3247* (2013.01); *H04L 63/061* (2013.01)

(58) Field of Classification Search
  CPC . H04L 9/0894; H04L 9/3247; H04L 9/0822; H04L 63/061; H04L 63/08
  See application file for complete search history.

(56) References Cited

U.S. PATENT DOCUMENTS

| 5,647,000 A | 7/1997 | Leighton |
| 5,812,671 A | 9/1998 | Ross |

(Continued)

OTHER PUBLICATIONS

Listing of Related Cases; Schwabe, Williamson & Wyatt, P.C.; Portland, OR; Jan. 20, 2016, 1 page.

*Primary Examiner* — Amir Mehrmanesh
(74) *Attorney, Agent, or Firm* — Schwabe, Williamson & Wyatt P.C.

(57) ABSTRACT

A central server configured with an Attribute Authority ("AA") acting as a Trusted Third Party mediating service provider and using X.509-compatible PKI and PMI, VPN technology, device-side thin client applications, security hardware (HSM, Network), cloud hosting, authentication, Active Directory and other solutions. This ecosystem results in real time management of credentials, identity profiles, communication lines, and keys. It is not centrally managed, rather distributes rights to users. Using its Inviter-Invitee protocol suite, Inviters vouch for the identity of Invitees who successfully complete the protocol establishing communication lines. Users establish and respond to authorization requests and other real-time verifications pertaining to accessing each communication line (not end point) and sharing encrypted digital files. These are auditable, brokered, trusted-relationships where such relationships/digital agreements can each stand-alone (for privacy) or can leverage build-up of identity confidence levels across relationships. The service is agnostic to how encrypted user content is transported or stored.

2 Claims, 4 Drawing Sheets

High-Level Depiction of Component- and Functional- Relationships in Combined Service Provider Model

Related U.S. Application Data continuation-in-part of application No. 13/096,764, filed on Apr. 28, 2011, now abandoned.

(60) Provisional application No. 61/792,927, filed on Mar. 15, 2013, provisional application No. 61/490,952, filed on May 27, 2011, provisional application No. 61/650,866, filed on May 23, 2012, provisional application No. 61/330,226, filed on Apr. 30, 2010, provisional application No. 61/367,574, filed on Jul. 26, 2010, provisional application No. 61/367,576, filed on Jul. 26, 2010, provisional application No. 61/416,629, filed on Nov. 23, 2010.

(56) References Cited

U.S. PATENT DOCUMENTS

| | | |
|---|---|---|
| 5,920,630 A | 7/1999 | Wertheimer |
| 5,963,925 A | 10/1999 | Kolling |
| 6,105,131 A | 8/2000 | Carroll |
| 6,229,894 B1 | 5/2001 | VanOorschot |
| 6,385,595 B1 | 5/2002 | Kolling |
| 6,584,567 B1 | 6/2003 | Bellwood |
| 6,721,783 B1 | 4/2004 | Blossman |
| 6,795,920 B1 | 9/2004 | Bacha |
| 6,941,454 B1 | 9/2005 | Spraggs |
| 6,988,199 B2 | 1/2006 | Toh |
| 6,996,841 B2 | 2/2006 | Kadyk |
| 7,020,688 B2 | 3/2006 | Sykes |
| 7,051,003 B1 | 5/2006 | Kobata |
| 7,093,121 B2 | 8/2006 | Barton |
| 7,100,054 B2 | 8/2006 | Wenisch |
| 7,236,950 B2 | 6/2007 | Savage |
| 7,493,661 B2 | 2/2009 | Liu |
| 7,509,281 B1 | 3/2009 | Brown |
| 7,571,325 B1 | 8/2009 | Cooley |
| 7,600,011 B1 | 10/2009 | Urbanek |
| 7,653,587 B2 | 1/2010 | King |
| 7,797,211 B1 | 9/2010 | Reeth |
| 7,966,646 B2 | 6/2011 | Chou |
| 8,275,984 B2 | 9/2012 | Loveless |
| 2004/0078337 A1 | 4/2004 | King |
| 2004/0249817 A1 | 12/2004 | Liu |
| 2005/0044197 A1 | 2/2005 | Lai |
| 2005/0050367 A1 | 3/2005 | Burger |
| 2005/0240758 A1 | 10/2005 | Lord |
| 2006/0085314 A1 | 4/2006 | Grim |
| 2007/0100913 A1 | 5/2007 | Sumner |
| 2007/0174410 A1 | 7/2007 | Croft |
| 2007/0198836 A1 | 8/2007 | Fedyk |
| 2008/0103912 A1 | 5/2008 | Naccache |
| 2008/0222736 A1 | 9/2008 | Boodaei |
| 2009/0083538 A1 | 3/2009 | Merugu |
| 2010/0057578 A1 | 3/2010 | Blair |
| 2011/0270763 A1 | 11/2011 | Graham |
| 2012/0023593 A1 | 1/2012 | Puder |
| 2012/0284506 A1 | 11/2012 | Kravitz |
| 2013/0262857 A1 | 10/2013 | Neuman |
| 2015/0312233 A1 | 10/2015 | Kravitz |
| 2015/0381580 A1 | 12/2015 | Kravitz |

A security Appliance deployed at an enterprise

SYSTEM AND METHOD TO ENABLE PKI- AND PMI- BASED DISTRIBUTED LOCKING OF CONTENT AND DISTRIBUTED UNLOCKING OF PROTECTED CONTENT AND/OR SCORING OF USERS AND/OR SCORING OF END-ENTITY ACCESS MEANS—ADDED

CROSS REFERENCE TO RELATED APPLICATIONS

This application is a continuation of U.S. patent application Ser. No. 14/218,897, filed Mar. 18, 2014, which claims priority to and is a continuation-in-part and claims priority under 35 U.S.C. §120 from co-pending U.S. patent application Ser. No. 13/481,553, tilted "METHODS AND APPARATUS FOR PREVENTING CRIMEWARE ATTACKS," filed May 25, 2012, by Kravitz, et al, which claimed priority under 35 U.S.C. §119(e) from U.S. Provisional Patent Application No. 61/650,866, filed May 23, 2012, entitled "METHOD AND APPARATUS FOR A CYBERSECURITY ECOSYSTEM," by Kravitz et al., which is incorporated herein by reference and for all purposes and which also claimed priority under 35 U.S.C. §120 from U.S. patent application Ser. No. 13/096,764, entitled "METHODS AND APPARATUS FOR A FINANCIAL DOCUMENT CLEARINGHOUSE AND SECURE DELIVERY NETWORK," filed Apr. 28, 2011, by Graham III et al., which claimed priority under 35 U.S.C. §119(e) from each of the four following U.S. provisional applications: i) U.S. Provisional Patent Application No. 61/330,226, filed Apr. 30, 2010, entitled "CLEARINGHOUSE SERVER FOR FINANCIAL DATA DELIVERY AND FINANCIAL SERVICES," by Graham III et al., ii) U.S. Provisional Patent Application No. 61/367,574, filed Jul. 26, 2010, entitled "METHODS AND SYSTEMS FOR A CLEARINGHOUSE SERVER FOR DELIVERY OF SENSITIVE DATA," iii) U.S. Provisional Patent Application 61/367,576, filed Jul. 26, 2010, entitled "METHODS AND APPARATUS FOR A FINANCIAL DOCUMENT CLEARINGHOUSE SYSTEM," by Graham III et al., and iv) U.S. Provisional Patent Application No. 61/416,629, filed Nov. 23, 2010, entitled "METHODS AND APPARATUS FOR SECURE DATA DELIVERY AND USER SCORING IN A FINANCIAL DOCUMENT CLEARINGHOUSE,", and v) U.S. Provisional Patent Application No. 61/792,927, filed Mar. 15, 2013, titled "SYSTEM AND METHOD TO ENABLE PM- AND PMI- BASED DISTRIBUTED LOCKING OF CONTENT AND DISTRIBUTED UNLOCKING OF PROTECTED CONTENT AND/OR SCORING OF USERS AND/OR SCORING OF END-ENTITY ACCESS MEANS, by Graham III et al., each of which is incorporated herein by reference and for all purposes.

BACKGROUND

1. Field of the Described Embodiments

The present descriptions generally relate to the field of enabling security based communication lines established between users when using X.509-compatible PKI and PMI and related tools (see FIG. 1 "High-Level Depiction of Component- and Functional-Relationships in Combined Service Provider Model"). Rather than a centrally managed system of identity and relationship recognition and authorization, these functions are transferred to users through an Inviter-Invitee protocol suite, through which Inviters vouch for the identity of Invitees who successfully complete the protocol establishing communication lines. The Security Ecosystem includes an Attribute Authority which acts as a Trusted Third Party mediating service provider for users that can: securely set up identities, uniquely associate keys to identities and their invitees, thereby securing each communication line. The system delegates authorizations to inviters and invitees for each communication line, and then proceeds to enable live and/or asynchronous uploads. It delegates authorization requests and real-time verifications to the users of the system, so they can create private communication lines for the sharing of digital files. The service is agnostic to the platform and or service that each user uses to transport or store their encrypted content.

2. Description of the Related Art

In establishing and achieving secure communications between individuals and other individuals and/or businesses and/or with other businesses, authentication of identities of the other parties has been a challenge. It can be a challenge for one party to be certain of the identity of another party as well as to determine if some unknown party is impersonating the intended party.

In the field of secure communications using public key cryptography, authenticating the pubic key of a remote party has been a challenge. A third party has been known to impersonate the intended party and provide a public key purported to be from the desired remote party, but it is not, thus security can be compromised.

Cryptographic systems such as PGP have attempted to mitigate such challenges by instituting "key signing parties" and creating a "web of trust". While helpful, such tools are cumbersome and less than absolute. Cryptographic systems such as PGP tend to become tools generally of the technically proficient who are willing to take the extra steps to overcome such limitations.

In the current environment of Internet security, it is considered by many security experts that to keep one's data secure one should encrypt it prior to transmitting it over the Internet ("secure in transit") as well as securing it when it is not being accessed ("secure at rest").

Cryptography is the desired tool to protect digital assets from access by others. While properly encrypted digital assets can be secure, managing, transmitting, protecting the keys that allow access to such assets should be done securely and properly or the keys can come into control of others thereby compromising the encrypted asset.

Symmetric key cryptography presents challenges not only in protecting the key in its owner's possession, but more critically in transmitting the key securely to a third party to whom the owner of the asset would like to provide access to the asset. This is can be difficult to accomplish.

Public key cryptography can be used to address this problem. The digital asset can be encrypted with a symmetric encryption key followed by the symmetric key being encrypted using the public key of an intended third party to whom the owner would like to give access to the asset. Cryptographically, and for security purposes, this procedure works well. A shortcoming is related to the previously described challenges associated with public key cryptography.

Businesses typically use centrally managed systems where users, their identities, and their relationships with other users are created and controlled. Particularly, with cryptographic capabilities involved, they aren't generally used or deployed unless there is a sophisticated Information Technology department supporting them. As a result the addition of new users, the establishment of user relationships, and the efficient flow of data between users are slowed by such a centrally managed bottleneck.

Additionally, it is difficult for businesses to efficiently manage (with good security of data and keys) the encryption of digital assets so that they are protected both in transit and at rest. This is particularly the case when a business needs to transmit a digital asset to a third party that is not within the business's secure network. Such limitations result in a business' difficulty or inability to securely transmit a digital asset to such a third party. For example, email is widely considered insecure for such uses. Due to such limitations, postal mail and express shipments (e.g. Federal Express) continue to be common with businesses in today's high tech age. Such mail/shipping options are both expensive and inconvenient for a business to provide.

The result of these limitations is that many businesses require their off-network third parties to login to a secure website and from there, then can access and download desired digital assets that are stored behind the business' firewall. Such a method is common today. It is efficient, convenient, relatively inexpensive and secure for the business. Examples of this are financial services business' customers login into secure websites to manually download bank statements, credit card statements, security trading statements, and all manner of other digital assets. Numerous other industries provide similar services (e.g., an insurance firm requiring policy holders to login to retrieve premium notices, copies of policies, notices, etc.; a healthcare provider may require patients to login to retrieve notifications from doctors, prescriptions and various other records). Such practices are not favorable for the third party users (e.g., customers). Customers should maintain multiple unique, secure logins for each such business visited and they generally take the time and trouble to manually retrieve, download and save such digital assets. It is noteworthy that once downloaded from such a business' secure website and saved to the third party user's computer, the digital assets are no longer secure. They are typically save in plain text and thus are not secure at rest.

In view of the above, it is desired to provide methods and apparatus for individuals and other individuals and/or businesses and/or with other businesses to mutually authenticate each other and establish secure communication lines between them by using a reliable system operated by a Trusted Third Party mediating service provider. And further that the users of such authenticated, secure communications lines can then utilize digital signed requests at the level of each communication line in order to maintain the security of their digital assets while in transit and/or at rest.

SUMMARY OF THE DESCRIBED EMBODIMENTS

The User-Directed, Authenticated, Cryptography-Enabling, Security-Focused Ecosystem (the "Security Ecosystem") described herein is being created to address a number of problems encountered in both by business enterprises as well as consumers.

One such problem is to address long-stalled "going-paperless" initiatives of enterprises: securely delivering statements, invoices, and other documents to their customers as opposed to postal mail or the inconvenient "come and get it" paradigm (requiring customers to log into enterprise websites and manually retrieve such digital assets. Tens of billions of documents need to be delivered annually from enterprises to their customers. Mail is extremely expensive. The "come and get it" paradigm is only marginally successful.

The "going-paperless" problem is a manifestation of a broader problem confronting enterprises: lack of a user-friendly, workable, authenticated, secure B2C and B2B communication capability. It is a challenge today for enterprises to easily and securely exchange sensitive documents with those outside their networks. The Security Ecosystem's integrated software product will ensure that the sensitive documents, etc., that enterprise users send to third parties who are off the enterprise can be delivered securely and privately to their correct, authenticated recipients.

To make the Security Ecosystem cryptographically sound, cryptographically based digital signing was built in. Therefore the Security Ecosystem may be able to also offer Digital Signatures as a feature. Such an integrated Digital Signature capability may address a need of enterprise businesses for non-repudiable digital signing capabilities both with individuals within and outside the enterprise.

The Security Ecosystem's software is generally oriented to reduce impact on the existing manner in which enterprise users create, store and transmit documents to others. The Security Ecosystem generally does not transport, store or have access to user's encrypted data. The Security Ecosystem generally attempts to provide security to user's digital assets by providing a system to protect those assets though encryption, both in transit and at rest.

For Consumers the Security Ecosystem may provide a tool so that consumers may communicate privately, securely and with confidence not only with their authenticated friends, family and associates, but also with their user-created groups (e.g., schools, teams, clubs, political organizations, etc.)

The Security Ecosystem may offer consumers a downloadable application to install on a desktop or mobile device that will "lock" (encrypt) and "unlock" (decrypt) documents using a cryptographic standard such as Advanced Encryption Standards (AES 256) as well as possibly other optional protocols. An authenticated, authorized recipient of a digital file may open it; locked files should not be viewable by advertisers, email or cloud providers, governments or others; private encryption keys can be held generally by their owners; and identities may be authenticated through user-managed tools.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
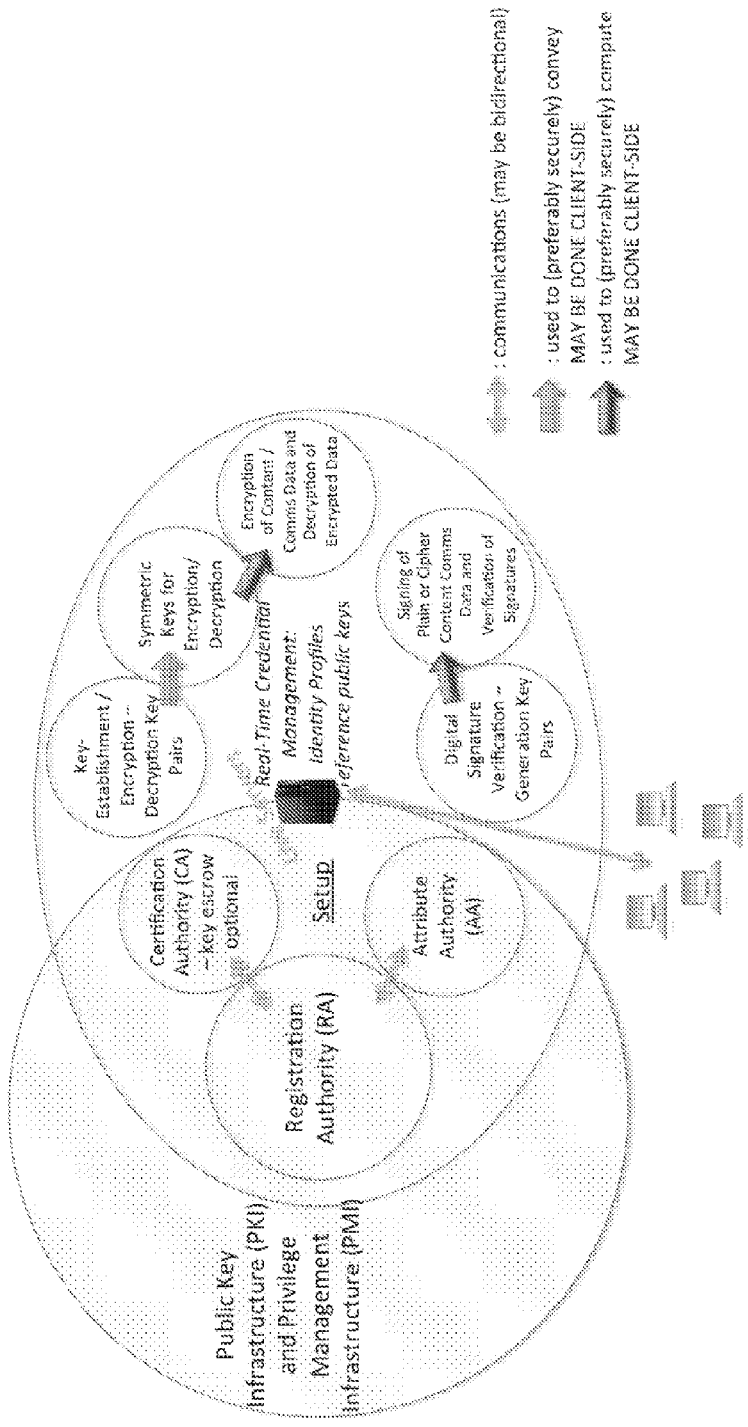
FIG. 1 shows a High-Level Depiction of Component—and Functional—Relationships in Combined Service Provider Model.

In a User-Directed, Authenticated, Cryptography-Enabling, Security-Focused Ecosystem (the "Security Ecosystem") an individual could operate under multiple identities, manage them centrally, and keep them private wherever desired. An Individual or group or business could tune up or down security at their discretion, so as to accomplish higher security for what he/they consider to be important communication lines and/or for specific digital assets (or likewise, lower security for less important communication lines and/or digital assets). Individuals and/or groups and/or businesses could mutually authenticate each other at a higher standard of care than is typically done (e.g., as a bank might authenticate its website customers. As a trusted third party, Security Ecosystem could authenticate individuals and groups and validate their transactions without being privy to the personal information used or the data exchanged. An individual or group or business could accomplish a very high standard of care for security, as the functions of a Security Ecosystem's could provide Security-as-a-Service, even using non-secure platforms like web mail and cloud services. Individuals or groups and/or businesses from totally different managed security platforms could communicate at high-grade assurance levels for secure end-to-end communication, without disrupting or altering their existing behavior or infrastructure.

What makes the Security Ecosystem unique is that the primary enabling security is based upon communication lines, not end points. This is why each user can have multiple identities: they can be anyone at the end of the communication line; the main thing is that the entity at each end agrees to communicate. The Security Ecosystem then protects entry into a device, entry into the Ecosystem software, and when desired, additional security to enter into unique documents. The Security Ecosystem extends from there the ability to validate identities (through various proprietary and common methods) and score identities (proprietary methods) where desired, and to on top of this the Ecosystem offer products for individuals, groups, administrators, as well as work flow packages, document signing, and customized vertical solutions. It is noted that the fundamental architecture is based on the communication line between users.

The Security Ecosystem has a proprietary Attribute Authority ("AA"), which acts as a Trusted Third Party mediating service provider. With the AA, the Ecosystem can: securely set up identities, uniquely associate encryption keys to identities and their invitees (communication lines), delegate authorizations (e.g. to inviters or to asynchronous uploads) and/or handle authorization requests and/or other real-time verifications pertaining to accessing communication lines and sharing digital files. Many scenarios have been described and solved for, including operating without a traditional Registration Authority ("RA"), or working with an external PKI/PMI, sharing certificates with 3rd parties, etc.

Figure 2:
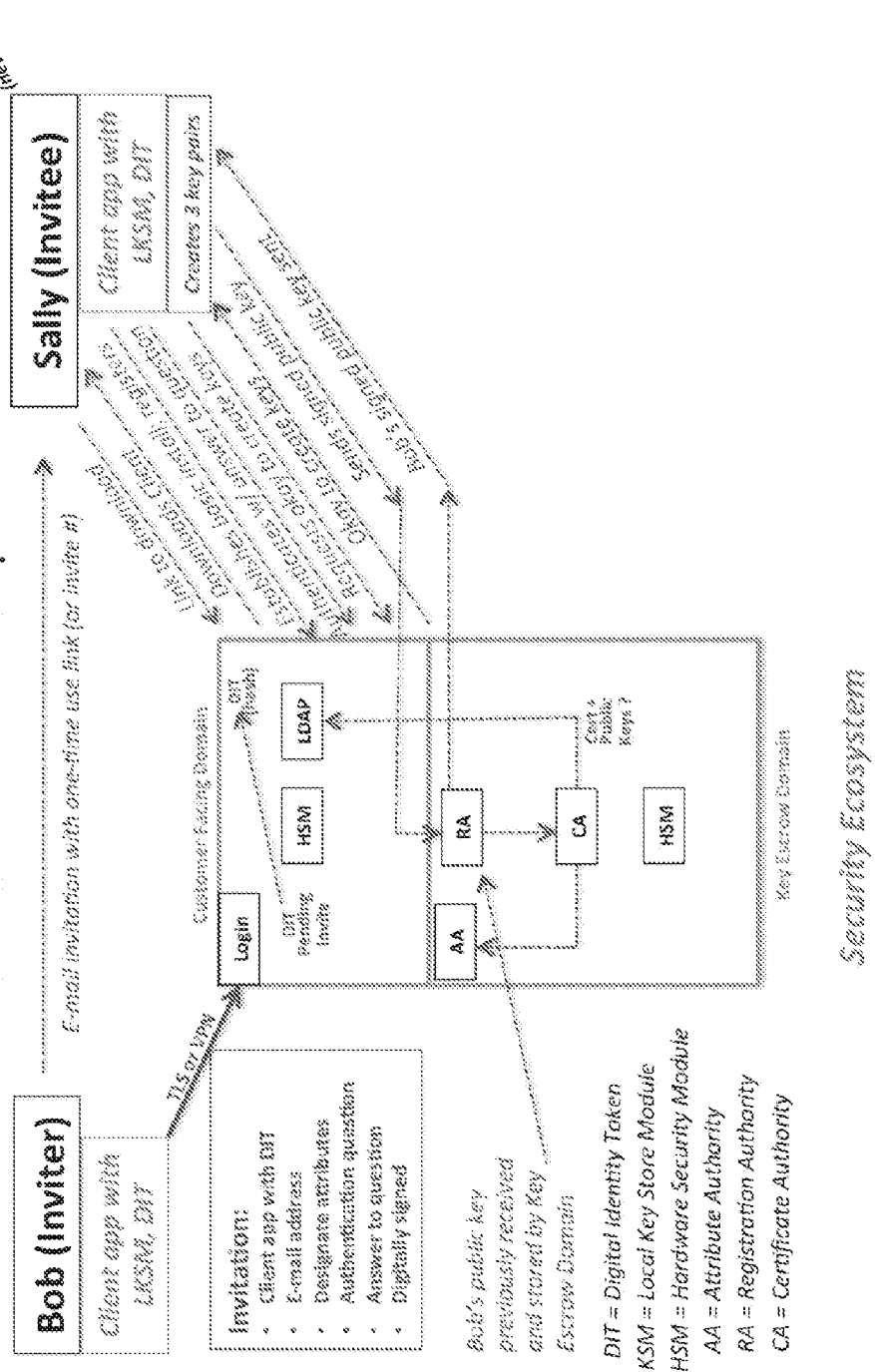
FIG. 2 shows An example of Steps in the Inviter-Invitee Protocol.

The Security Ecosystem is designed to be agnostic to where and/or how email or other content is hosted. Furthermore, a primary Ecosystem strength that is typically not a part of other offerings is auditable brokering of trusted relationships through the Ecosystem's Inviter-Invitee protocol suite (see FIG. 2 "Inviter-Invitee Protocol Example"), where such relationships and/or digital agreements may each stand alone (for higher privacy), and/or can optionally leverage build-up of identity confidence levels across relationships to the extent that policy allows. The resulting individual or chained attribute certificates could potentially be used to enhance offerings of other providers that are primarily designed to try to assure continuity of unclonable identifiers across Web sessions, rather than to add value relative to third-party (such as the Ecosystem) evidence-gathering and attestation-generation with regard to actual user identities. Third-party support for user identities may become more important when high-value transactions are at stake. The fact that most other typically systems don't rely on the services of a trusted third-party entity is directly related to the fact that there are no attestations or proofs of identity. While such a trusted third party could issue identity-based cryptography credentials, public key certificate, attribute certificates, etc. without conditioning such issuance on demonstrable proof or evidence of actual identity, the real value of such third-party involvement is in a system like the Ecosystem, where Inviters essentially vouch for the identity of Invitees who successfully complete the Invitee protocol.

The Security Ecosystem may be deployed in either a cloud-hosted environment or in an Enterprise (i.e., business) deployment on premise in the private enterprise's hosted environment. In an enterprise-hosted environment, the Ecosystem could be provisioned in private-label basis associated with the enterprise. The enterprise could use it as a Business-to-Consumer security solution, for example. Such a deployment could reduce any concern an enterprise might have about an outside provider having access to privileged information. (See FIG. 3 "A security Appliance deployed at an enterprise").

Figure 3:
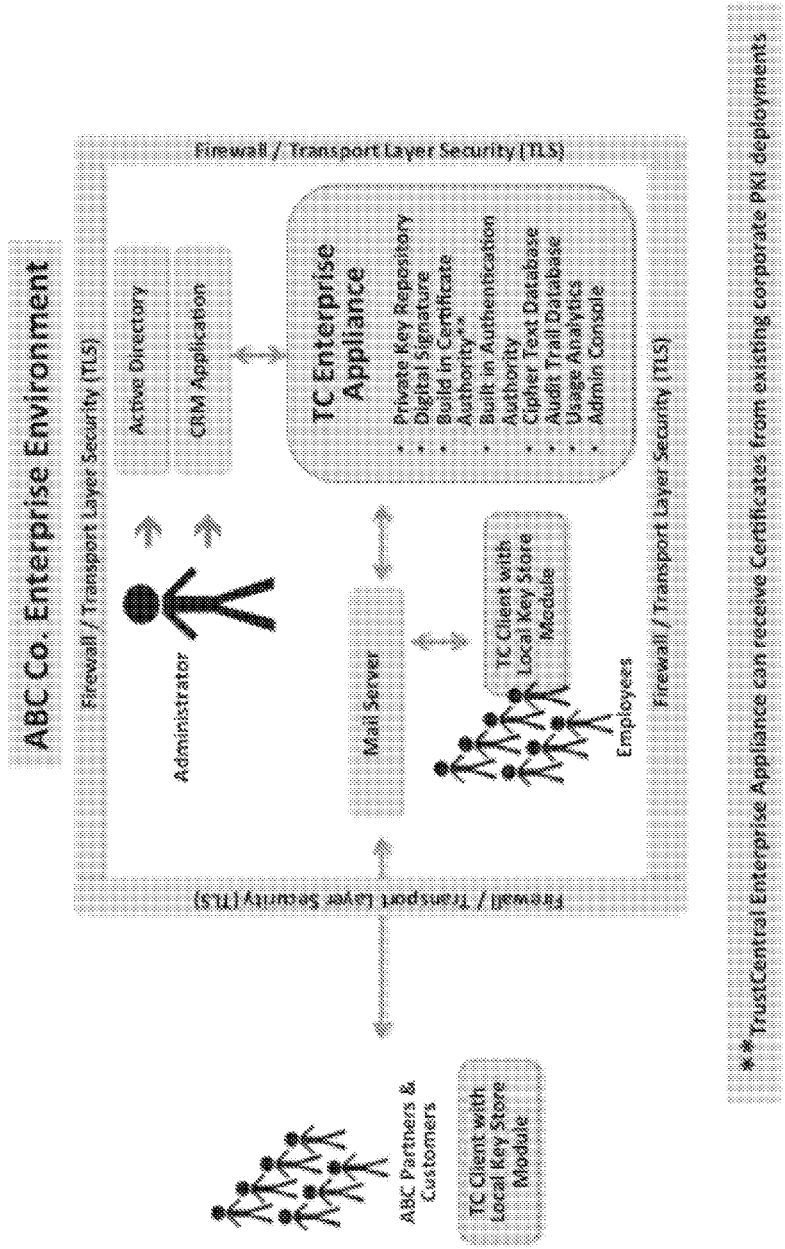
FIG. 3 shows A security Appliance deployed at an enterprise.

In an enterprise deployment Security Ecosystem can create a security appliance that deploys at such a private enterprise to create and manage private/public key pairs for customers, partners and associates who are outside the enterprise security envelope (See FIG. 3 "A security Appliance deployed at an enterprise"). The appliance may contain an Attribute Authority ("AA") in a typical HSM, which may interoperate with the typical enterprise Certificate Authority (CA) (or in another embodiment with a CA integrated with the AA). There is no external validation authority or integration. The appliance may integrate with typical LDAP tools for CRM contacts, Active Directory settings, etc. and accomplishes real-time provisioning and revocation. The Enterprise uses the appliance to invite their customers or other contacts to download a private-branded thin client that delivers the security as a service in the name of the Enterprise to the computer or other device of the customer or other contact. The appliance may provide administrative tools for security settings and optionally an audit trail of activities with reporting.

In one embodiment the enterprise appliance of (optionally privately-branded infrastructure of security components will enable enterprise users to share documents and communications with external individuals and/or companies using strong authentication and encryption. The solution can enable the enterprise's IT Security Group to control, host, and manage a security application that invites outside parties to download a client to their smart device and/or computer in order to share content with enterprise users over any content transport and/or delivery platform (i.e. email, Dropbox, FTP sites, etc.). Such an ecosystem appliance may provide a variety of benefits such as one or more of: end-to-end security from the enterprise users to outside parties without extending the firewall and without requiring federated identity management; facilitating the creation of agreement-based relationships within a trusted framework so that the enterprise can have higher confidence that the sensitive data and messages it shares outside of its network are being shared generally only with the enterprise-authorized Off-Net Users; manages user-directed, end-point encryption of digital assets for secure sharing with other users (where this end-point encryption can also be used for secure storage and retrieval); may provide a future capability for enterprise cross-certification resulting in public keys that map to identities on one enterprise being recognized by another enterprise in order to facilitate automated inter-enterprise, secure communication; may provide practical adoption of non-repudiable Digital Signing of documents so that Digital Signing may become a reliable, user-contact tool and trusted tool of the enterprise's corporate records; may provide the availability of trusted audit trails with detailed, cryptographically-validated records of the encryption, decryption and authentication operations applied to users' messages; may be branded with the "enterprise's" name.

In other embodiments, the Security Ecosystem appliance may provide optional features such as: giving enterprise-authenticated On-Network Users an ability to invite new Off-Net Users to establish a persistent, secure communications line between them; a communications line may be established between an Off-Net User and either: (a) one or more single enterprise On-Net Users; or (b) a defined internal the enterprise Group (e.g., a sales team); or (c) a combination of (b) and (c); the Security Ecosystem appliance may integrate with the enterprise's Public Key Infrastructure (PKI) and Privilege Management Infrastructure (PMI) in order to provide Inviter and Invitee protocols that serve to securely initialize or update persistent secure communications lines between the enterprise and the enterprise-authorized Off-Net Users; communications handling preferences or instructions may be incorporated into the Inviter and Invitee protocols, e.g., proffered by the Inviter and accepted by the Invitee; endpoints may be characterized by context-specific identities (e.g., an Off-Net User may have an "Attorney" identity on a communications line with the enterprise executives, and may also have a "VIP Guest and/or Customer" identity on a distinct communications line with, for example, a Sales or enterprise Host Services; the activity of endpoints of a communications line will be governed by an end-to-end Digital Agreement established during Inviter-Invitee processing; using such an agreement-based foundation, the system may enable a sender to designate a specific, known recipient for his/her information, such that only the chosen recipient can open it; context-specific identities/user identity profiles may be dynamically customizable through drag-and-drop operations, thus enabling broadening of context, (based for example, on successful completion of multiple Invitee roles; communications lines may be revoked by Users and/or by enterprise administrators based on enterprise policy, either on demand and/or via automated procedures tied to Digital Agreement enforcement; Inviter and Invitee processing may be asynchronous in that following an Inviter protocol run, a thereby designated Invitee chooses whether or not to accept a prompt to engage the Security Ecosystem mediating service provider in an application of the Invitee protocol; Inviter-Invitee protocol processing is self-contained in that it routinely supplies un-forgeable evidence of successfully concluded Invitee processing by the intended Invitee to the Inviter and/or authorized delegates of the Inviter; Inviter-Invitee authentication could be based upon a shared secret such as an account number or password or other price of information known to the Inviter and Invitee. The Security Ecosystem appliance is also designed to interoperate with various methods of multi-factor authentication using third party applications and devices, if desired by the enterprise.

In other embodiments the Security Ecosystem appliance may provide for a digital asset to be encrypted at an endpoint (such as an enterprise server or desktop or mobile device or other); the appliance manages the use of cryptographic keys through easy-to-use software for provisioning and revoking the use of these keys according to the instructions of the enterprise; appliance may optionally be customized for enforceable handling (via appropriate encryption) of unique digital assets as set by the sending user endpoint, possibly as directed by terms incorporated into the Digital Agreement governing that asset type (e.g., a digital asset of that type may not be opened on a mobile device, but only on a computer) with flexibility at the discretion of the enterprise; the appliance may be optionally customized to integrate with a metadata-injection tool applied to the enterprise files, to label them confidential or not, which might be used by the enterprise to signal whether such a file would be subject to encryption or not.

In various embodiments an enterprise may use the appliance in one or more of these ways: while the Security Ecosystem software creates encrypted data at endpoints, the appliance and/or servers hosted by the enterprise generally need not access, store or transport the encrypted data (but may do so in another embodiment); encrypted data can be stored in any cloud storage and/or sent over any public network, cloud platform or email system without being readable by such a service provider; Inviter and Invitee protocol processing may generate audit trails based, in part, on digital signatures, and which are controlled entirely by the enterprise (but may be shared in another embodiment); the appliance may be optionally customized such that highly sensitive data could be designated to require one or more additional security step in order to gain access to its plaintext form (e.g., password protected or multi-factor authentication required).

In other embodiments an enterprise may use the Security Ecosystem appliance for one or more purposes, such as: to securely share confidential documents with Off-Net Users such as attorneys, healthcare professionals, CPA's, business partners, Government Regulators of many sorts, VIP Customers/Guests or anyone or any business or other entity where security of information is desired; common enterprise departments that could be attractive candidates for making use of the appliance capabilities are: Executive, Legal, Marketing, Finance, Sales teams, and others; an example of a noteworthy use case in a hospitality enterprise could include that between VIP hosts and hotel VIPs with the VIPs possibly benefitting from the prestige of a secure, private app on their device and/or computer in order to securely communicate and/or share sensitive assets with the enterprise; another example of a possible benefit to a hospitality enterprise would be the ability to immediately change the Host-to-VIP secure link when a host leaves the employ of the enterprise with the immediate substitution to a new host identity to assume responsibility and control of that Host-to-VIP communication line; other examples of types of sensitive information for which easy-to-use data encryption might be chosen in order to communicate privately, securely and verifiably with an Off-Net User could include business proposals, trade secrets, legal agreements, invoices, offers, reservations, plans, as well as many others; the Security Ecosystem will meet or exceed industry standards and may be audited to assist the enterprise in complying with various governmental privacy laws dealing with the secure data transfer and storage of personal and other sensitive information; the Security Ecosystem is expected to assist the enterprise in protecting against supply chain poisoning by requiring all received digital assets to have been digitally signed and encrypted at their point of origin by a the enterprise-authenticated identity; the enterprise may address the "Going Paperless" paradigm: instead of sending an email to customers (and/or others) saying something to the effect of "your statement/invoice is ready, come and get it", the enterprise simply emails the encrypted statement/invoice directly to the customers (and/or others) saying something to the effect of "your statement/invoice is attached, securely locked/encrypted for you" with the enterprise optionally later receiving a verifiable audit trail reporting when their Off-Net User used his/her private key to access the original cleartext of the transmitted digital asset; further secure point-to-point communications with existing and/or future enterprise location will be enabled.

In another embodiment the Security Ecosystem appliance will have flexibility in integrating with an enterprise's PKI functionality relative to its scalability potential to service clients outside of the enterprise and accommodate and adjust to any potential reuse of components (such as RA) across the PKI and PMI as well as to accommodate to the enterprise's Disaster Recovery Plan (DRP).

In another embodiment there could be a Consumer Cloud-based deployment of Security Ecosystem, which could accommodate individuals, small businesses, and any enterprise that does not have a centrally managed PKI infrastructure. This Ecosystem could enable B-to-B and/or B-to-C and/or C-to-C communication. This embodiment does not include major enterprise-grade tools such as system administration, SDK's, cross-certification, work flow, sophisticated Trust-related algorithms, etc. that would be in "Enterprise Cloud Product". Even so, it is a comprehensive application that provides high security to many users. It could be considered similar to how employees of enterprises started using Dropbox before an Enterprise Edition was ever built. The following functionalities could be included in such a "Consumer" product: a cloud-based enrollment with download of local app; distributed functionality between the appliance as the CA, and local app as a key store.

In a further embodiment of Consumer cloud product, here are possible requirements:

A. Overview

The Consumer product will be an easy-to-use application for individuals to secure documents (through encryption) and share credentials (by invitation) with contacts and associates. With the Consumer product, individuals can take control of their security. Documents secured with the Consumer product can travel through any email or cloud-based storage platform and remain secure and unreadable by any 3rd party.

The Consumer Product leverages high-grade security standards, and is designed to give people privacy and the freedom to decide how and where they share information, and with whom.

Core functions are:
Register at The Consumer Product.com
Sign up (free or fee) [0048] Download the application (easy & fast)
The Consumer Product generates user identity and keys
The local app registers your device and generates a local private key Use the application to invite contacts to share secure documents
Invite contacts using an email address
Friend receives a link to a website for enrollment
Friend is registered in Inviter private application.
Friend can now unlock Inviter document, and unlimited secure docs can be shared between the two parties.
Use the application to lock and unlock documents
The application may Auto-launch when a locked "Consumer Product doc" is double-clicked (retrieved from storage or email or other source) and if the user is already signed in, the document will open.
Lock a document, which includes selecting who can open it (either oneself, or add names from the list user invited connections, or invite a new associate.)
Account Administration
For each contact, view dates and times when docs have been opened
Upgrade account to add more contacts.
Change/reset password, account keys.
Download application updates B. Architecture 1. General Structure
Web-based Enrollment, Account Management
Private, cloud-based PKI/PMI with Administrator App
Device-side App for Opening & Closing Docs 2. Application Software
Web Services & UI
Back end infrastructure (HSM) and administration UI
Mobile/Smart Device App: support for iOS, Android, maybe Blackberry, Windows Mobile, etc.
Desktop support for OS-X 10.5+, Windows 7/8, etc.
Desktop/Device-side UI (possibly JavaScript or other)

3. Security Architecture
X.509 with ECC
PKI
PMI
Key Escrow
Customized code for PMI—a proprietary Authentication Authority with Inviter Protocol
Digital signature with Time/Date stamp
Local Key Store Module at mobile/desktop device level, No Firmware, no interoperability with other apps v.1.

Generally requires VPN technology to connect. The device-side app in most circumstances will be online connected to the Security Ecosystem server to unlock documents operate.

C. User Interfaces Descriptions

1. Register at a Designated Website

Sign up (free or fee): Needs ability to enter a user name (will become the default identity) and password, with a quality check on password and a captcha (or other). Sign up with a passcode/free coupon, or pay by credit card, maybe also PayPal. Pricing model is to be determined. In one example, the people an Inviter invites get communication line at Inviter's expense (free to them) but would need to pay to add more associates of their own. A security policy and liability waiver will likely be required as part of account registration.

The Consumer Product generates user identity and keys On the back end, the inviter protocol is activated (proprietary code on the Authentication Authority), and the system generates keys.

Download the application: The system can generate a downloadable executable with instructions with a functional sequence similar to Dropbox, or Skype download.

The local app registers user device and generates a local private key. This is a back end device-side function and may display animation or sound at the device so the user can see that something related to high security is occurring. On the backend, the inviter protocol is activated (proprietary code on the Authentication Authority) to register the device-side app, and the device-side app generates a private key.

2. Use of the Application to Invite Contacts to Share Secure Documents

Invite contacts using an email address. The Inviter opens The Consumer Product device-side app, selects "add a contact", and enters an email address and any name for contact. The name of the inviter (from original registration)

is auto-completed, but the inviter can override and enter any name desired for this communication line. The inviter clicks "invite". The request transmits over VPN to TC Cloud, and TC server generates an email invite to the recipient.

Friend receives a link to a designated website for enrollment. Friend (Invitee) receives link to enroll at The Consumer Product. The link associates the inviter with the invitee, and the Consumer Product registration page completes the protocol to initiate app download. The Invitee, as a new user, accomplishes a downloaded consumer app already provisioned with the Inviter name in the contact list. An email or other message is generated to the Inviter and the Invitee alerting them that they can now share secure files.

Friend is registered in Inviter private application. Upon next login, Inviter is provisioned with the contact name (and public key) of invitee.

Friend can now unlock Inviter/Inviter document, and can send you secure docs. Inviter and Invitee can now share docs. Invitee can add contacts by going to admin tool of their The Consumer Product device-side app. A pop-up reminder to add contacts may be desired.

3. Use the Application to Lock and Unlock Documents

Auto-launch application when a locked Consumer Product Created doc is double-clicked (retrieved from storage or email or other) and open the document. A document that has been locked by an app within the system would use a standardized appendix to created files, e.g. "documentname.tex". Device-side application needs policy for how long it stays logged-in, or under what conditions it logs out. If logged-out, possibly the application is prompted to be opened when a locked document with the standardized appendix is clicked, and password is requested. The concept is to wrap the locked document in a Consumer Product executable. It would operate similar to an Adobe PDF.

Lock a document, which includes selecting which user can open it (either the originator, or add names from the list of authenticated connections, or invite a new user.) The option to lock could be accessed from the system print menu or possibly from a new, added menu item or other. When locking, the user may select one or more documents and one or more recipients. Recipient should already have been invited and be on the authenticated list of provisioned contacts for the sender. When a document is locked with the public key associated with a designated user, generally the originator by default is also issued a key so the software may create a locked copy of any document sent that the originator himself can store and later open.

4. Account Administration

For each contact, view dates and times when docs have been opened. This would be an audit trail log, showing when document files were locked and subsequently unlocked. It would not keep copies of the actual documents. Basically populates the digital signature records from cloud service, and should sync when login occurs. Could be sorted by communication line (Invitee name), then recent activity or other.

Edit contacts. Provides a capability where contacts may be revoked. If a communication line is revoked, there could be a pop-up requesting extra approval and possibly an option for the system to alert both parties via email (or other) that the communication line has been revoked. Communication line can be re-established with a new Inviter/Invitee protocol. Additional invites are also originated here—"invite a new associate", and needs to correlate to account balance (how many out of a possible purchase package remain) and possible prompt to purchase more contacts when the remaining balance reaches a predetermined amount.

Upgrade account. User may use credit card on file to purchase additional packs of contacts (when contacts are charged for) or can enter new payment method. There will be other types of upgrades later in product lifecycle.

Change/reset password, account keys. System has a method for reprovisioning keys.

Download application updates. This should prompt when a person logs in at the local app and the app does an auto-check for updates.

5. Other Content on Website

Basic Web-pages of about the service, security policy, etc.
Change/reset password, upgrade account
Download application updates
Other features, items as appropriate
E. Additional Features for Future Versions TrustScore—this is a measure of length of time on the system, frequency of use, size of social network, and level of verification/endorsement of the identity. This is an algorithm with various rules AccessScore—this is a measure of predominantly multi-factor authentication, and (for example) whether the user is coming in from a browser as opposed to their provisioned application. These are the functions that would result in the ability to generate a score.

Digital Signature Usage

Supports the non-repudiable audit trail, which can exist with a certified PKI.

(For some security conscious users, a "no records retained" option would be offered.)

They are also the backbone of a workflow system that would literally sign a document electronically.

Digital signatures are the backbone of expected multiple approval levels and multiple identity types. There are many use cases in Enterprise deployments.

Cross-certification as well as probably other features related to sharing identities Validating 3rd party information with the Consumer Product digital signature (for example for a prescription or stock trade).

In another embodiment there could be a User Interface that removes complexity, with animation to demonstrate to the user that he is accomplishing security. Additionally there could be add on products offered for sophisticated consumers (to accomplish higher grade security, using digital signatures and multi-factor authentication). One example of such could be an out-of-band authentication product (Using barcode and/or QR code technology) that raises standard of care on man in middle attacks (described in detail elsewhere). There could be tools and/or widgets for cross platform consumer application interoperability (such as shared SAML assertions, federated identity, etc., as well as mini apps for smart devices, integration with 3rd party multifactor authentication). There could be a Peer group administration module as well as Peer to peer Workflow tools.

In another embodiment there could be a basic security protocol in order to offer a product that would deliver the most basic and valuable product: online security-as-a-service. This could include a downloadable thin-client which would protect any digital asset and provide a method of sharing it over any email, cloud, storage or document collaboration platform with a military-grade standard of care for security. This could offer an innovative, proprietary security architecture and delivers a revolution to the market: a usable and understandable security product for consumers.

Figure 4:
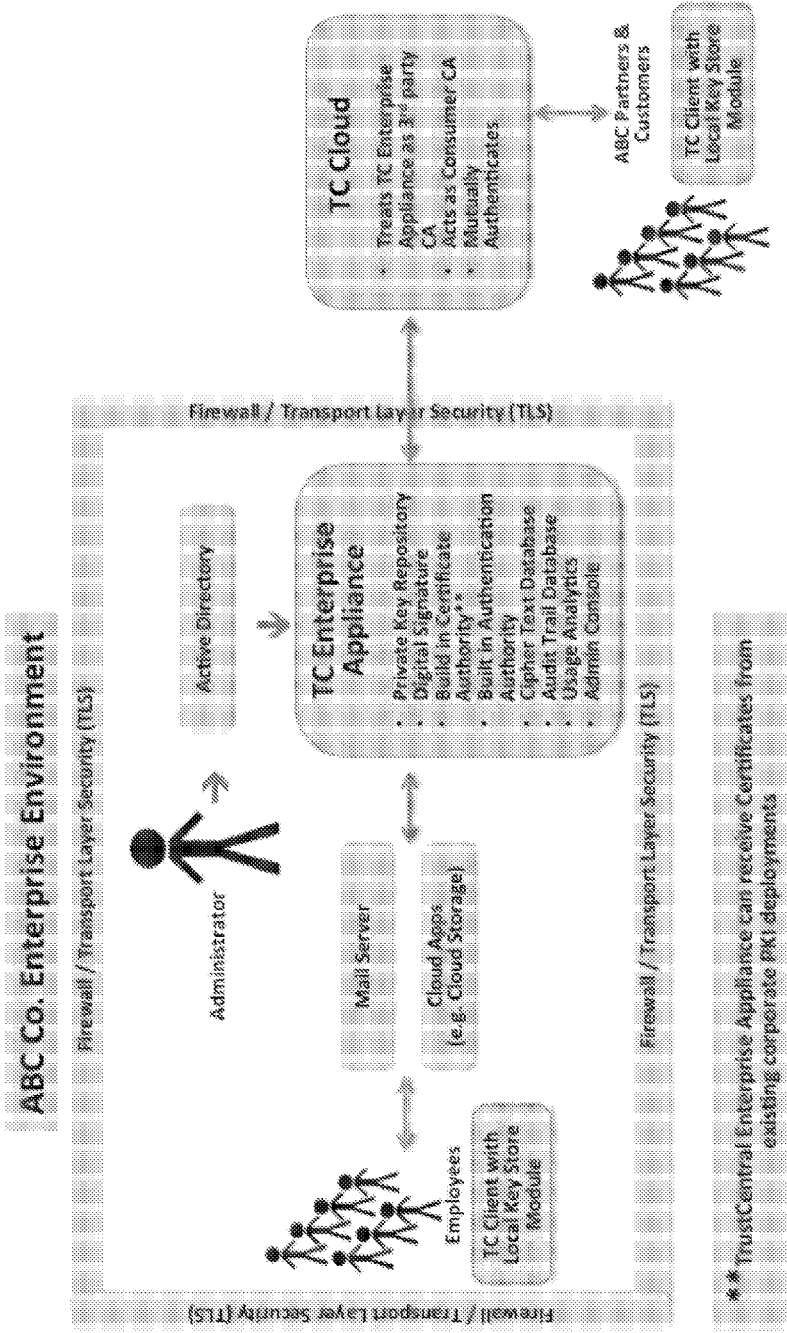
FIG. 4 shows An enterprise grade cloud-based B-to-C security solution.

In another embodiment there could be an enterprise grade cloud-based B-to-C security solution. An analogy could be to look at Dropbox, which has a consumer product with heavy-user upgrades, and a commercial version, with major institution upgrades. The backbone is Dropbox, and these customer-centric products and features are modules catering to different demands and tolerances for sophistication, integration, privacy, complexity and convenience. Such a Cloud-based Enterprise Product could interoperate with a Private Label Appliance so that the Private Label Appliance could connect to the Cloud-based Enterprise to communicate with "anyone"—not just customers in their ACL or CRM database, using the system's Authentication solutions, etc, and its Cloud CA and meanwhile not put any of an enterprises Certificates or audit trail information or usage analytics outside their private network. (See FIG. 4 "A An enterprise grade cloud-based B-to-C security solution"). These are examples of various possible functionalities of the Cloud-based Enterprise Product: Customized branding within the thin client (for example, when a person opens the thin client to unlock a document from a specific Group (like a Bank), the application will deliver the bank brand in the graphic; Cloud storage & transport of documents in order to automate B-to-C document delivery; Storage of hashes of documents in order to prove whether a document has been altered; vertical-specific and/or modular products such as stock trade verification, prescription drug fulfillment, etc. (e.g. could include non-repudiable proof of instructions and compliance, as well as mutual authentication as well as enable workflow such as multiple approval levels, as well as upgraded security features); platform-specific deployments (e.g. "app store" product for AWS, Salesforce, EBay etc.; a host of add-on products apps for B-to-C enablement such as: digitally signed objects (enables workflow, permission levels); Workflow tools to enable web forms and paperless transactions; TrustScore alerts and management; expanded business intelligent tools and/or analytics; audit trail/diligence product; B-to-C statement/invoice/other encryption capability for secure transport to a designated recipient; Group management tools; escrow offering; Legal compliance offering (e.g. holding documents or orders in escrow as fiduciary).

In another embodiment there would be a sequence of possible steps that a new user could likely go through to become provisioned with the Security Ecosystem application. These steps could be such as these:

A. User goes to website for the app and clicks Download Customer facing domain at website launches the Universal Software Provisioning Sequence (USPS).

B. Executable checks for device type, verifies no existing TC client,

C. At customer facing domain, USPS compiles next available:
GUID
Nonce
Position Vector
Bits Vector
Random number (R-VPN)

D. Subscriber device receives download and opens software

E. App Opens
Subscriber enrolls locally:
Username (unique username not required for security/repeats' allowed because
TC tracks the name+unique GUID, not just the name)
Password (complexity check)
Verify Password
Mobile # (if you'd like to provision your mobile device as well. Read-only)
More data than this is not required user can be completely anonymous F. Hit Enter G. Client sends package back to server:
GUID
Nonce in sequence
Username
Hash of password
LKSM seed
Public Key of VPN (unique to the device)

H. The Security Ecosystem server checks the Package
GUID matches
Nonce matches
Accepts new Username & stores the hash of the password and the SALT value.
Potentially we encrypt these at the HSM and then store.

I. The Security Ecosystem server spawns a piece of the seed.

J. The Security Ecosystem server sends a challenge using position vector to see if MAC address bits and random bits correct. The local client should correctly accomplish the right answer, plus the server gets back the client confirmed MAC address and now stores it at server.

K. The Security Ecosystem server sends the partial seed (random number) and the vector to lock/mask the seed to the client.

L. This specific step is what creates the LKSM, Local Key Store Module: The client generates entropy and finishes the seed (hashes the pieces together). The seed is locked and masked, and the masking is unique to that client. This seed can be used later to provision other devices for the same user. (Note—you could provision the other devices by using your phone as an intermediary, or you could use the seed to "invite" another device using inviter protocol. David had several methods here.)

M. The Security Ecosystem server server now sends random numbers: the random number for the Key Establishment Key Pair and the random number for the Digital Signature Key Pair.

N. The client generates the key pairs (Suite B style): the Key Establishment Key Pair and the Digital Signature Key Pair.

O. The client sends the two Public Keys back to The Security Ecosystem server Server: the Key Establishment Public Key and the Digital Signature Public Key.

P. The Security Ecosystem server gives these two public keys certificates and associates them with that user's account. (Uses HSM. Doesn't use GUID so no association of users and keys exists at TC).

The private keys are separated. To reconstruct them, the client software needs the server to send the random number to the private key. The client will take the random number, + add the seed from the LKSM in order to acquire the private key.

The private key is used to compute the public key. Each communication line has cryptographically unique public key.

The Provision Protocol is now complete. The user can now act as an inviter, or simply lock a document for themselves. The provision protocol had already provisioned the user in advance of inviting any communication lines with the cryptographically unique public key. It is reserved in waiting until the user invites someone or locks a document, and then the next key is generated and held in waiting.

In another embodiment, existing users could login into the app in a sequence such as this (or with some variation):

A. Subscriber opens TC local app
B. Server sends GUID positions to client
C. Client verifies last stored nonce matches GUID and returns:
  user name & password entered (hash function of password sent)
  private key of VPN "Device Key"
  2-way authenticated
D. For security purposes, each time the Security Ecosystem server and the client communicate a position vector and a bit vector get reset. The Security Ecosystem server may query the client when they talk. The Security Ecosystem server queries, the answer comes back and immediately it's scrambled again; it does no repeat the same values going forward. A feature called "ABBA" would be used at this point. "ABBA" is a made up name to describe an innovation that is in essence a continuously progressing conversation between the Security Ecosystem's customer facing domain and the customer local client. The conversation gives the last answer plus a new piece of information each and every time, essentially passing the baton (a nonce) between the two end points of the communication line. This is a continuously progressing sequence, for example the Security Ecosystem server sends AB, then the local device gives back BC (C is new nonce), and then the Security Ecosystem gives back (for example) CD and the local device gives back (for example) DE. A third party attempting to intercept the communication between the two parties should not be able to re-create the previous sequence because it was randomly created and is no longer current, will not be used again. This procedure terminates a conversation if it is not properly replicated. ABBA participates in the security of the VPN between the client and the Security Ecosystem server. With the VPN there is the VPN private/public keys and then on top of that there is the ABBA session manager. It could be possible for ABBA to be used to conduct an intermittent session check in session (not just at the beginning) ending validation and also possibly at a session upgrade. These are further variations and examples:
  Server sends a challenge
  Client Sends a response
  Server ascertains the MAC address of device (if changed, login rejected)
  Server sends release code to release the seed value
  Server sends a new lock code (random value+seed)
  Server sends a new nonce
  Server sends a new position vector (for bits & mac address)
  Server sends a new BITS vector
  Client overwrites the old nonce with new nonce.
E. User is logged in and ready to encrypt/decrypt/manage account.
  Now: when time out or logout, new lock codes are in place
  Next login: Server sends positions, client gives back the random bits+Mac Address. There should be continuity from one session to next, or login is rejected. Prevents man in middle attack, prevents your client from being copied to another piece of hardware—not transportable.

In another embodiment, the system has an option that may be implemented by users called "tunable security". For examples of Tunable Security, a user might, for example, invite 10 people. They have baseline shared secrets, mutually authenticated comm lines. A user could add another person and might require that that authenticate every time he/she accesses a protected document or a communication line (e.g., through a fingerprint app, other multi-factor authentication, a Security Ecosystem QR/bar code methodology, or other). A user may choose to insist on session authentication (e.g., ABBA) and/or also insist on authentication for one or more documents.

In another embodiments, Key Management Issues are addressed regarding the LKSM in which the SEED is generated by first instance of the client for the given user. A SEED can be generated by using combined randomness from both client-local source(s) and mediating service provider, where the server's contribution is transmitted encrypted over the VPN connection. SEED can be securely transmitted to other instances of the client for the same user: Can potentially be done by using the VPN keys of the clients, if authenticity can be determined, e.g., if such VPN public keys bear public key certificates. VPN configuration may include provisioning of a key pair for use in client authentication. Such key pair is specific to the instance of the client, and need not be backed up. Although such key pair is intended primarily for secure communications between the client and the mediating service provider, it may also be used for synchronizing user-level keying material across instances of a client associated with the same user (without involving the mediating service provider directly in such exchange so as to assure inaccessibility by the service provider). The user's mobile phone and/or a peripheral storage device (e.g., USB) may be utilized for backup and transfer. The mediating service provider may issue a digitally signed software token that must be re-presented to the client in order to trigger encrypted export of user-level keying material to another instance of the client, potentially via a mobile device associated with the user and local to the source or destination during some sort of pairing with each. The software token may be movable to a peripheral storage device (where a hash is retained in the client).

In another embodiment, methods are described as to how Groups can be handled: A group does not identify an individual, but defines function/role, such as host entity of a customer relationship. An active group may include as few as one active member. The group administrator is considered a member of the group. An attribute certificate for the group indicates group characterization (e.g., department(s) and/or role(s)), and references a public key certificate that includes a signature verification public key. The corresponding signature generation private key is held by the group administrator. This key is used to assign the group public key that is used for encryption or key establishment. This mechanism enables the group administrator to (re-)assign values to the group public key as long as the attribute certificate (or its replacement) is currently valid and the signature verification public key has not been revoked. There are at least two ways for the group administrator to securely provide the group private key to other current members of the group: (a) use can be made of (certificate-bearing or otherwise authenticated) encryption public keys or key establishment public keys of prospective group members; (b) use can be made of ephemeral key establishment public keys that have been digitally signed using digital signature generation private keys of prospective group members that correspond to certificate-bearing or otherwise authenticated signature verification public keys. If a (non-group administrator) group member's access is to be deleted, the group administrator can assign a new value to the group public key and distribute the corresponding group private key to surviving group members (as well as to new group members if/when such are added).

In other embodiments, these characteristics further describe the functionality of the Security Ecosystem appliance:

The nature of the design puts the PMI in charge of keys, not the PKI which improves the security of the system;

The Inviter Protocol adds attribute certs that point to public keys. The system picks these keys up for each relationship and collects them at the server. Through this procedure, the secret question isn't compromised. It all allows the system to pool and score user's identities.

The system does not allow the live server to attach the secret question onto an identity in order to reduce insider and offline attacks.

The system may enable document-only access or "pick-up" with public key pick-up only.

In embodiments regarding Digital Signature Key Pairs:

There are server level Digital Signature keys for signing for VPN/TLS and HSM purposes.

A server Digital Signature delivers a signature that may validate a document, and/or a public key request with time/date stamp. This can affirm existence of a document without forgery. With such a validation process, the server can thus know which document is being opened even if the server didn't store the document.

A server may store a hash of a document and have the local client send a log back to the server regarding the hash of the document so the server may know when document is unlocked/opened. The server may revoke document-level keys or make them expire in a certain time frame. The server is also able to see if a document has been changed by cross-checking the hashes. If hashes are kept in plain text, the server may be able to demonstrate (for example) that pornography had been encrypted and/or decrypted, and possibly prove a crime occurred in a court of law.

In embodiments regarding system functions:

A system administrator would not have many duties at the user level. The users themselves revoke or reset themselves. They should have a variety of abilities, such as to find a GUID and/or revoke access to one or more documents.

The invention claimed is:

1. A method of secure communication, comprising:
    downloading, using a trusted third party server, a first app for execution on a first electronic device, the first app creating a first set of encryption keys including a first public encryption key and a first private encryption key on the first electronic device;
    generating, using the trusted third party server, an invitation to establish a secure communications line between the first electronic device and a second electronic device based on receiving an invitation request for the invitation from a first user of the first electronic device, the invitation request including identification and authentication information to identify and authenticate a second user of the second electronic device together with requested terms of digital agreement covering the secure communications line;
    transmitting, by the trusted third party server, the invitation to the first electronic device;
    transmitting, by the trusted third party server, a second app for execution on the second electronic device upon request by the second electronic device, the second app creating a second set of encryption keys including a second public encryption key and a second private encryption key on the second electronic device; and
    authenticating, at the trusted third party server, the second user of the second electronic device based at least in part on an acceptable response to the identification and authentication information provided to the trusted third party server by the first user in the invitation request and based at least in part on acknowledgement of an installation of the second app on the second electronic device and acceptance of the requested terms in the digital agreement covering the secure communications line;
    wherein the trusted third party server makes available the first public encryption key of the first user to the second app and the second public encryption key of the second user to the first app to authenticate the first public encryption key and second public encryption key;
    wherein the first app generates an encrypted digital asset by encrypting a digital asset on the first electronic device using a symmetric encryption key;
    wherein the first app generates an encrypted symmetric encryption key by encrypting the symmetric encryption key using the second public encryption key of the second user;
    wherein the first electronic device transfers the encrypted digital asset and the encrypted symmetric encryption key to the second electronic device, such that the second user is able to decrypt the encrypted symmetric encryption key using the second private encryption key and decrypt the encrypted digital asset using the then decrypted symmetric encryption key to thereby establish the secure communications line; and
    wherein the invitation includes a client app with a digital identity token, e-mail address, designated attributes, authentication question, answer to authentication question, or a cryptographic digital signature.

2. A trusted third party system, comprising:
    a memory device to store instructions; and
    one or more processing units to execute the instructions stored in the memory device to:
        transmit a first app to a first electronic device, the first app creating a first set of encryption keys including a first public encryption key and a first private encryption key on the first electronic device;
        generate, based at least in part on receiving an invitation request from a first user of the first electronic device, an invitation to establish a secure communications line between the first electronic device and a second electronic device, the invitation request including identification or authentication information to identify or authenticate and request terms of digital agreement covering the secure communications line between a first user of the first electronic device and a second user of the second electronic device;
        transmit the invitation to the first electronic device;
        transmit a second app to the second electronic device based at least in part on a request by the second user of the second electronic device, the second app creating a second set of encryption keys including a second public encryption key and a second private encryption key on the second electronic device;
        authenticate the second user of the second electronic device based at least in part on an acceptable response to the identification or authentication information provided to the trusted third party server by the second user in response to the first user transmitting the invitation to the second user and based at least in part on acknowledgement of an installation of the second app on the second electronic device and acceptance of the requested terms in the digital agreement covering the secure communications line;

wherein the trusted third party server makes available the first public encryption key of the first user to the second app and the second public encryption key of the second user to the first app to authenticate the first public encryption key and second public encryption key;

wherein the first app generates an encrypted digital asset by encrypting a digital asset on the first electronic device using a symmetric encryption key;

wherein the first app generates an encrypted symmetric encryption key by encrypting the symmetric encryption key using the second public encryption key of the second user;

wherein the first electronic device transfers the encrypted digital asset and the encrypted symmetric encryption key to the second electronic device, such that the second user is able to decrypt the encrypted symmetric encryption key using the second private encryption key and decrypt the encrypted digital asset using the then decrypted symmetric encryption key to thereby establish the secure communications line between the first user and the second user; and wherein the invitation includes a client app with a digital identity token, e-mail address, designated attributes, authentication question, answer to authentication question, or a cryptographic digital signature.

* * * * *